Aug. 26, 1958 S. G. BLUMENSAADT 2,849,031
WIRE FORMING MACHINE
Filed Oct. 7, 1955 11 Sheets-Sheet 1

INVENTOR.
SVEND G. BLUMENSAADT
BY
Gustav. A. Wolff
ATT

Aug. 26, 1958   S. G. BLUMENSAADT   2,849,031
WIRE FORMING MACHINE
Filed Oct. 7, 1955   11 Sheets-Sheet 4

INVENTOR.
SVEND G. BLUMENSAADT
BY
ATT.

Aug. 26, 1958　　　S. G. BLUMENSAADT　　　2,849,031
WIRE FORMING MACHINE
Filed Oct. 7, 1955　　　　　　　　　　　　11 Sheets-Sheet 5
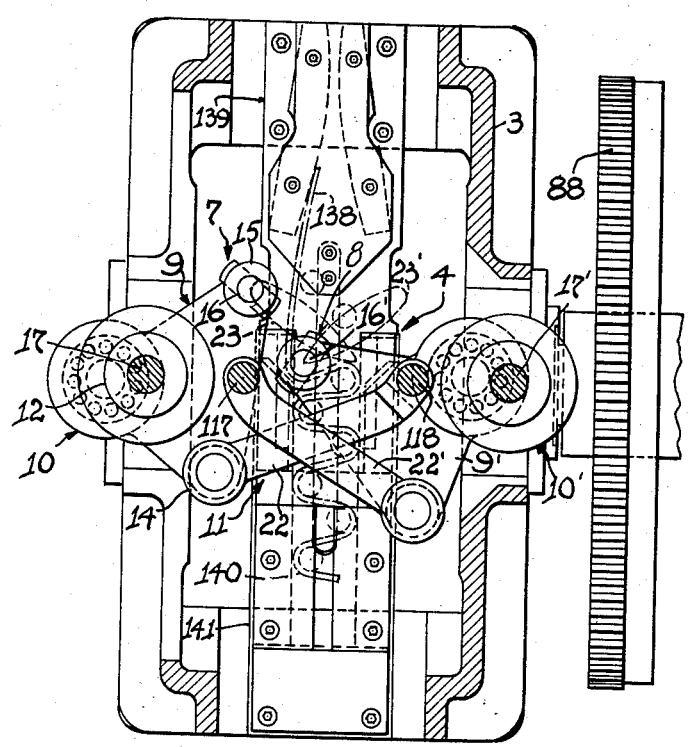
Fig. 6
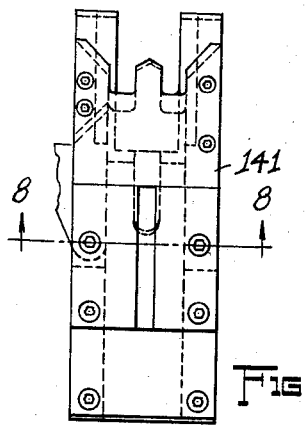
Fig. 7
Fig. 8
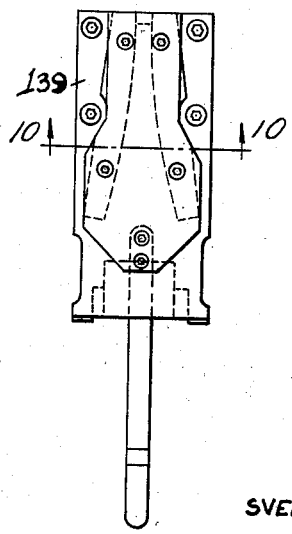
Fig. 9
Fig. 10
INVENTOR.
SVEND G. BLUMENSAADT
BY Gustav A. Wolf
ATT.

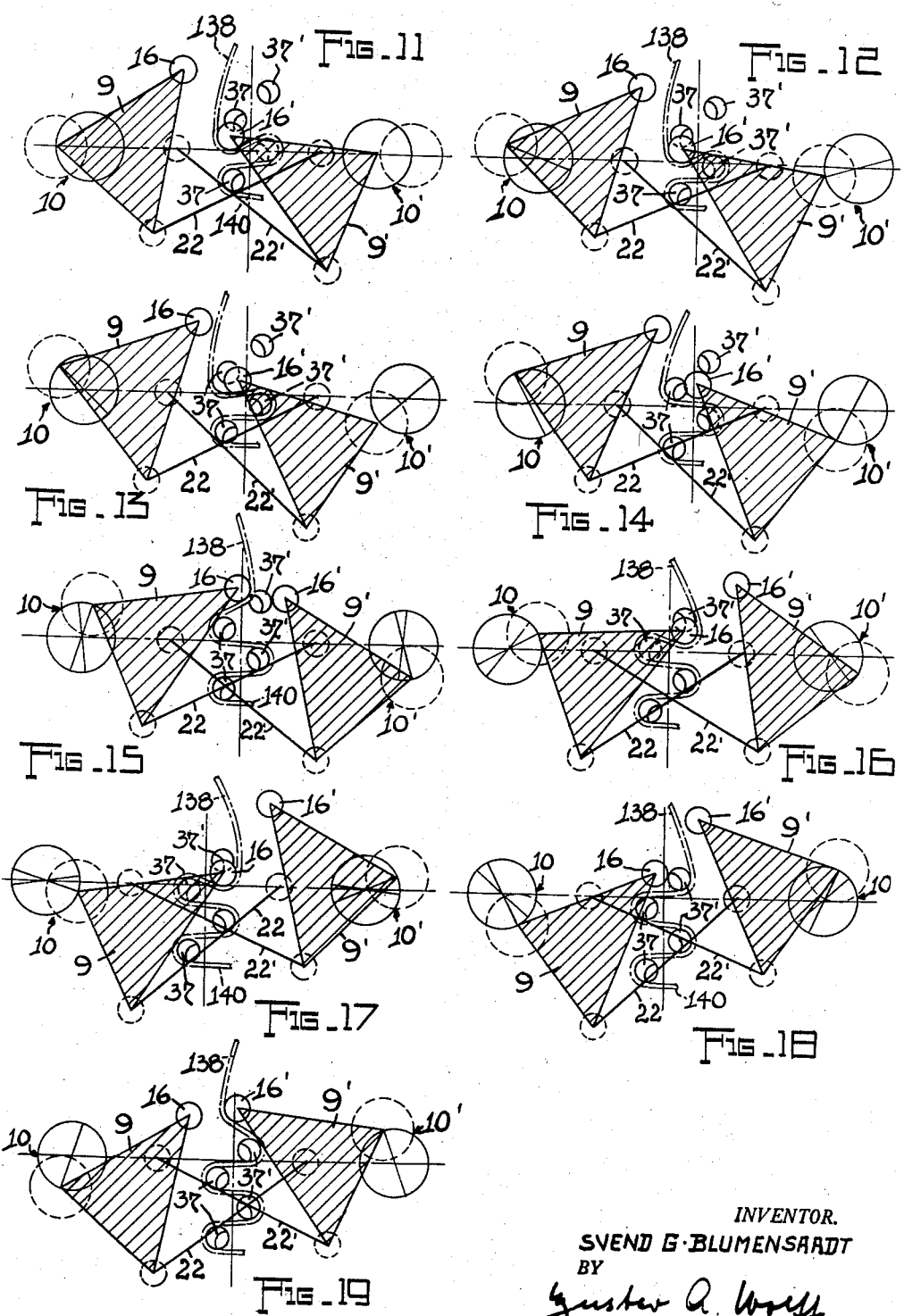

Aug. 26, 1958 S. G. BLUMENSAADT 2,849,031
WIRE FORMING MACHINE
Filed Oct. 7, 1955 11 Sheets-Sheet 7

INVENTOR.
SVEND G. BLUMENSAADT
BY
Gustav A. Wolff
ATT.

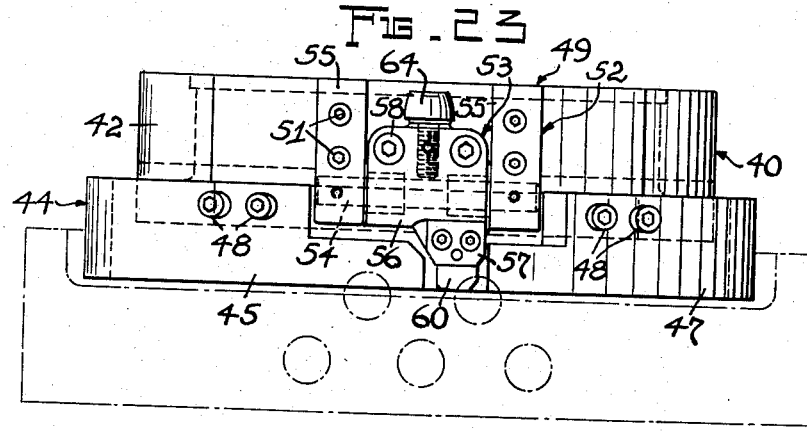
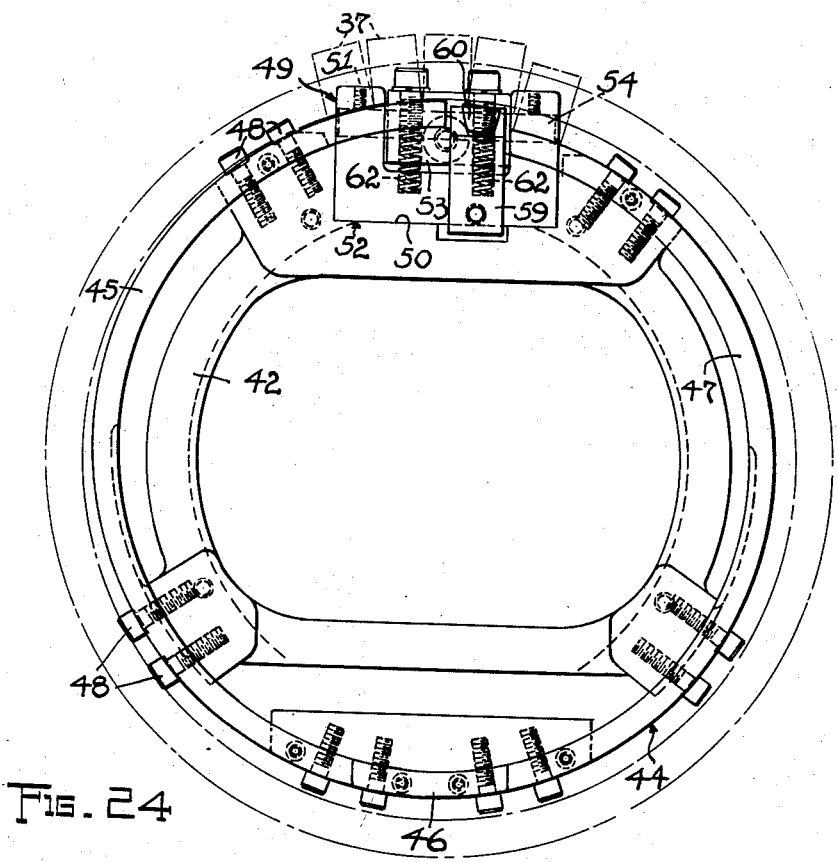

Aug. 26, 1958

S. G. BLUMENSAADT 2,849,031

WIRE FORMING MACHINE

Filed Oct. 7, 1955

INVENTOR.
SVEND G. BLUMENSAADT
BY
*Gustav A. Wolff*

ATT.

Aug. 26, 1958

S. G. BLUMENSAADT 2,849,031

WIRE FORMING MACHINE

Filed Oct. 7, 1955

INVENTOR.
SVEND G. BLUMENSAADT
BY
*Gustav A. Wolff*
ATT

Aug. 26, 1958  S. G. BLUMENSAADT  2,849,031
WIRE FORMING MACHINE
Filed Oct. 7, 1955  11 Sheets-Sheet 11

INVENTOR.
SVEND G. BLUMENSAADT
BY
Gustav A. Wolff
ATT

United States Patent Office 2,849,031
Patented Aug. 26, 1958

2,849,031

WIRE FORMING MACHINE

Svend G. Blumensaadt, Beachwood Village, Ohio, assignor to The Universal Wire Spring Company, Bedford, Ohio, a corporation of Ohio Application October 7, 1955, Serial No. 539,184

11 Claims. (Cl. 140—71)

This invention relates in general to wire bending machines adapted to bend wire to elongated flat zigzag-shaped wire strip and, more particularly, to wire bending machines in which folding elements alternately swing inwardly and outwardly into engagement with straight wire stock to form opposite turns therein by cooperation with shiftable transfer pins radially mounted on a forming wheel arranged below the folding elements in symmetrical relation with respect thereto.

These wire bending machines generally embody wire bending mechanism of limited adjustability so that each machine is limited to the manufacture of a single type of wire strip with predetermined shape and form of turns and predetermined length of turn connecting cross members and their angular relationship with respect to each other.

The general object of this invention is the provision of a wire bending machine with a new and improved wire bending mechanism constructed to effect bending of straight stock to wire strips of different shape and form of their turns, and spacing and angular relation of the cross members connecting the turns.

This general object, according to the invention, is attained by a wire bending mechanism constructed with wire bending elements supported to be moved by combined rotary and lateral motion in oblong, circuitous, horizontal curvatures related angularly to the longitudinal axis of the wire bending mechanism.

Another object of the invention therefore is the provision of a wire bending machine with wire bending mechanism embodying wire bending elements coupled at spaced points with crank means and link means arranged to continuously impart to the wire bending elements combined rotary and lateral motion and effect travelling of these wire bending elements through oblong, circuitous, horizontal curvatures angularly related to the longitudinal axis of the wire bending mechanism.

A further object of the invention is the provision of a wire bending machine with wire bending mechanism of the type referred to above, in which the crank means and link means both are adjustably mounted on the wire bending machine to permit adjusting of the motion of the wire bending elements so as to form the wire stock to the desired zigzag shape.

Still another object of the invention is the provision of a wire bending machine with wire bending mechanism of the type referred to above, in which the link means are mounted on the wire bending machine by a specifically constructed bracket means including axially shiftably supported elements pivoted to the link means for their adjustable connection to the wire bending machine.

Still a further object of the invention is the provision of a wire bending machine with a wire bending mechanism constructed to rapidly, accurately and inexpensively shape or bend a wire to the desired zigzag or sinuously corrugated wire strip, the wire bending machine being of as simple a design and low cost as possible and practical and efficient for all purposes intended.

Additional objects and novel features of construction, combinations and relations of parts by which the objects in view have been attained, will appear and are set forth in detail in the course of the following specification.

The drawings accompanying and forming part of the specification illustrate a certain practical embodiment of the invention, but it will be apparent as the specification proceeds that the structure may be modified and changed in various ways without departure from the true spirit and broad scope of the invention.

In the drawings:

Fig. 6 is a horizontal sectional view on line 6—6 of Fig. 4.

Fig. 7 is a plan view of the wire entrance guide.

Fig. 8 is a sectional view taken on line 8—8 of Fig. 7.

Fig. 9 is a plan view of the wire exit guide.

Fig. 10 is a sectional view taken on line 10—10 of Fig. 9.

Figs. 11 through 19 are diagrammatic views of the wire bending mechanism showing successive positions of the bending and transfer pins in a half working cycle of the wire bending mechanism. In these diagrammatic views Fig. 11 shows the position of bending and transfer pins in accordance with Fig. 6.

Fig. 12 shows bending and transfer pins in advancing positions for bending a wire and transfer the last bent portion thereof to a transfer pin.

Fig. 13 shows bending and transfer pins in further advancing position.

Fig. 14 shows the last bent portion of the wire engaged with a transfer pin and the bending pin furthermore advancing toward the wire.

Fig. 15 shows further bending and advancing operations.

Fig. 16 shows still further bending and advancing operations.

Fig. 17 shows a newly bent wire portion and one of the transfer pins advancing toward such newly bent wire portion.

Fig. 18 shows the newly bent wire portion transferred to the said one of the transfer pins and the first bending pin advancing toward the wire; and Fig. 19 shows the transfer and bending pins still further advancing.

Fig. 20 is a side view partly in section on line 20—20 of Fig. 21 of one of the crank shaft assemblies effecting such shifting of the bending and transfer pins.

Fig. 21 is a plan view of Fig. 20; and

Fig. 22 is a bottom view of Fig. 20.

Figs. 23 through 25 show one of the transfer pin controlling mechanisms. Thus,

Fig. 23 is a plan view of such transfer pin controlling mechanism.

Fig. 24 is an elevational view of Fig. 23; and

Fig. 25 is a side view of Fig. 24.

Fig. 27 is an enlarged sectional view taken on line 27—27 of Fig. 5.

Fig. 28 is a sectional view taken on line 28—28 of Fig. 27.

Fig. 29 is a sectional view taken on line 29—29 of Fig. 27; and

Fig. 30 is a sectional view taken on line 30—30 of Fig. 27.

Fig. 32 is a plan view of the modified transfer pin actuating mechanism.

Fig. 33 is an elevational view of Fig. 32; and

Fig. 34 is a side view of Fig. 33.

Figure 1:
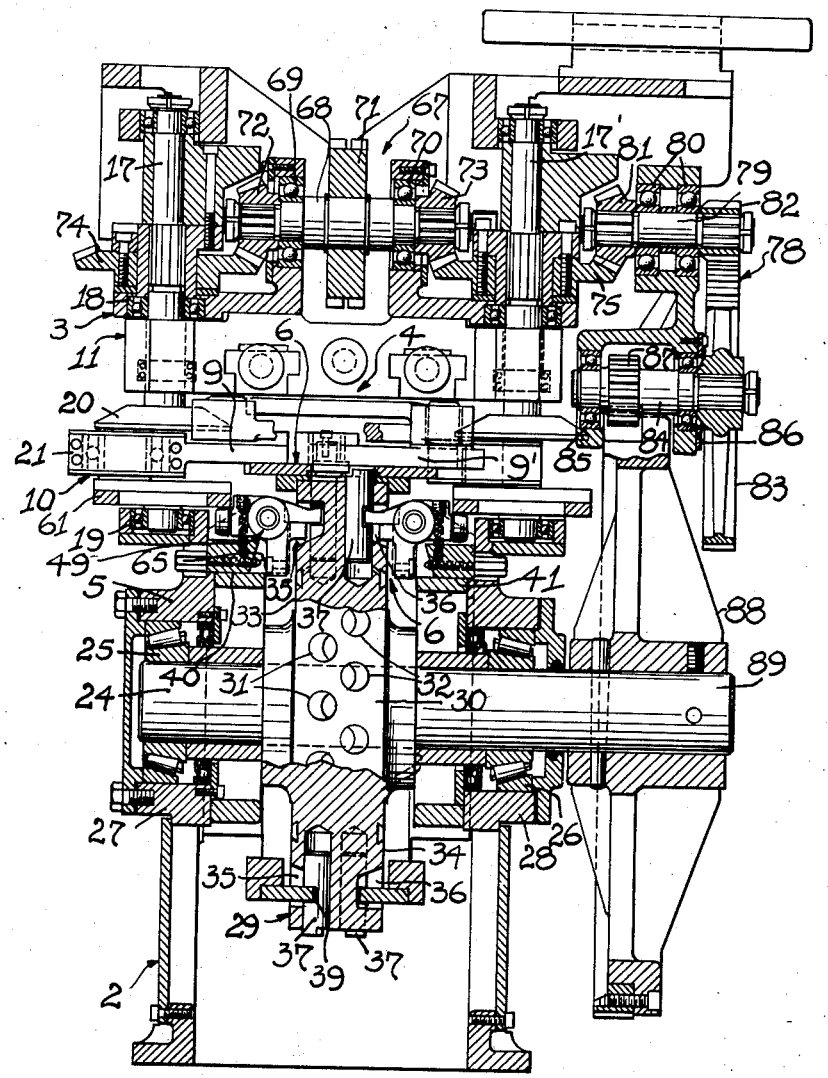
Fig. 1 is a transverse sectional view through a wire bending machine embodying the invention.

Referring now in detail to the drawings, the wire bending machine shown therein includes a frame 2, the upper portion 3 of which mounts a wire forming mechanism 4 and the lower portion 5 of which mounts a wire transfer mechanism 6 cooperating with mechanism 4 in forming straight wire into zigzag-shaped wire strip.

Figure 26:
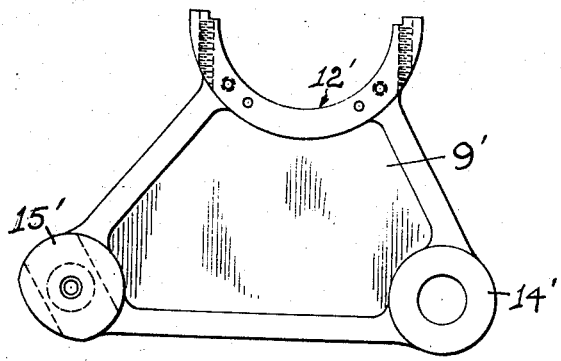
Fig. 26 is a plan view of a bending pin supporting member.

Wire forming mechanism 4 consists of two symmetrically constructed, symmetrically arranged wire bending devices 7 and 8, so that description of only one of the wire bending devices, to wit: wire bending device 7, is deemed to be necessary. This latter wire bending device includes a shiftable wire bending element 9 (see Fig. 6) coupled with a crank shaft assembly 10 and a link assembly 11. Wire bending element 9 (see Fig. 26) is substantially triangularly shaped, has one corner portion 12 rotatably coupled with crank shaft assembly 10, another corner portion 14 pivoted to link assembly 11, and supports at its corner portion 15 a wire bending pin 16 cooperating with wire bending pin 16′ of wire bending device 8 in bending a wire passing through wire mechanism 4, as will be later described.

Figure 2:
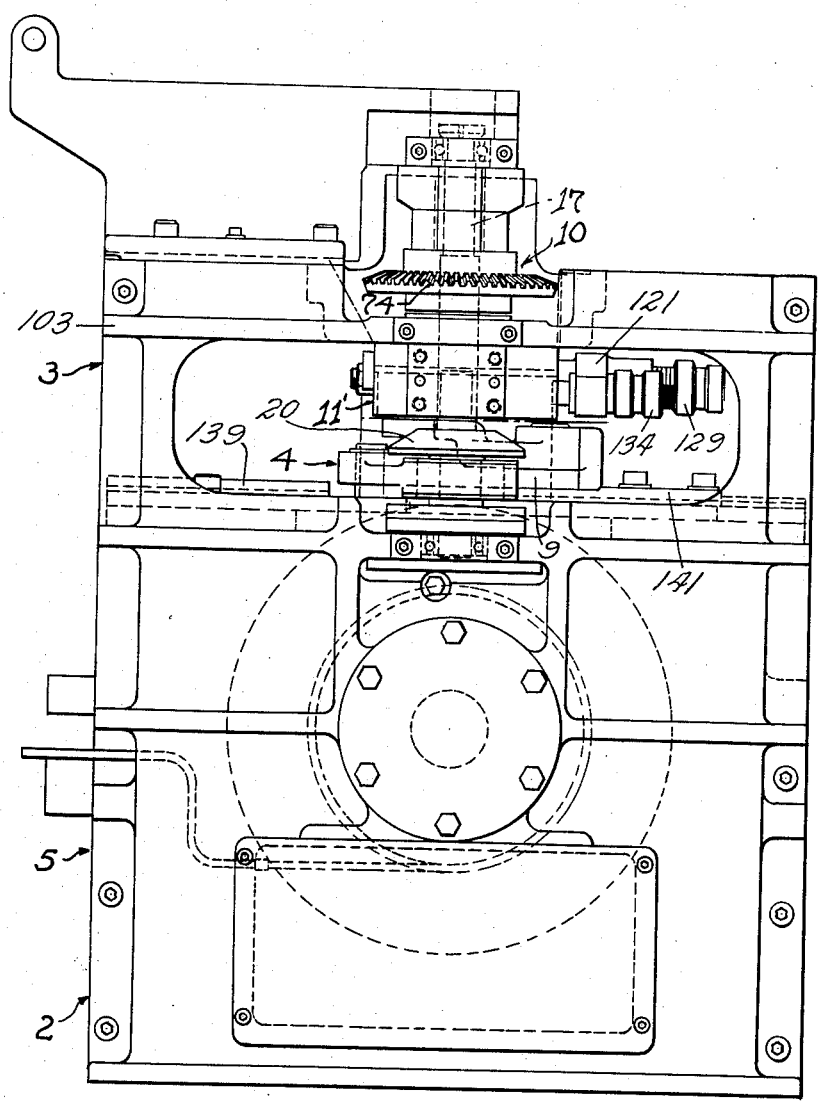
Fig. 2 is a fragmentary front elevation of the wire bending machine shown in Fig. 1.
Figure 20:
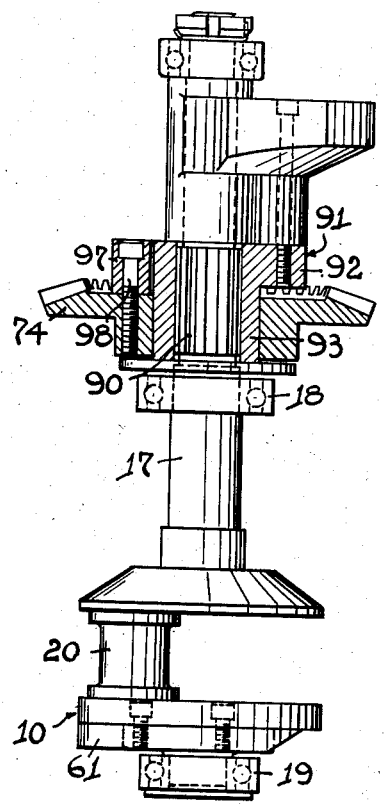
Figs. 20 through 22 show part of the drive mechanism effecting oscillatory shifting of the bending pins and transfer pins. Thus.

Crank shaft assembly 10 (see Figs. 1, 2 and 20) includes a crank shaft 17 journaled in ball bearings 18 and 19 on upper frame portion 3 with a crank arm 20 rotatably coupled to corner portion 12 of bending element 9 by split bearing 21 to effect by actuation of crank shaft assembly 10 shifting of bending element 9, the corner portion 14 of which is coupled with upper frame portion 3 by link 22 of link assembly 11. Crank assembly 10 when actuated shifts wire bending pin 16 on bending element 9 in an elongated circuitous path 23 (see Fig. 6) angularly related to the axis of the wire forming mechanism. Wire forming mechanism 4 cooperates with wire transfer mechanism 6 in lower frame portion 5, which transfer mechanism includes a shaft 24 journaled in bearings 25, 26 in side walls 27, 28 of lower frame portion 5.

Shaft 24 mounts a forming wheel 29 having in its peripheral wall 30 parallel rows of radial bores 31, 32, which are staggered with respect to each other, and in its side walls 33, 34 circuitous grooves 35, 36 arranged to intersect radial bores 31, 32 which support transfer pins 37 formed in their peripheral walls 38 with recesses 39 disposed transversely of to the longitudinal axes of the transfer pins for their axial shifting by stationary transfer actuating devices 40, 41 engaged through circuitous grooves 35, 36 with recesses 39 of transfer pins 37. Transfer actuating devices 40, 41 are symmetrically arranged with respect to the longitudinal axis of wire transfer mechanism 6 and of identical construction, so that description of only one of these transfer actuating devices, to wit: actuating device 40, is deemed to be necessary.

Figure 25:
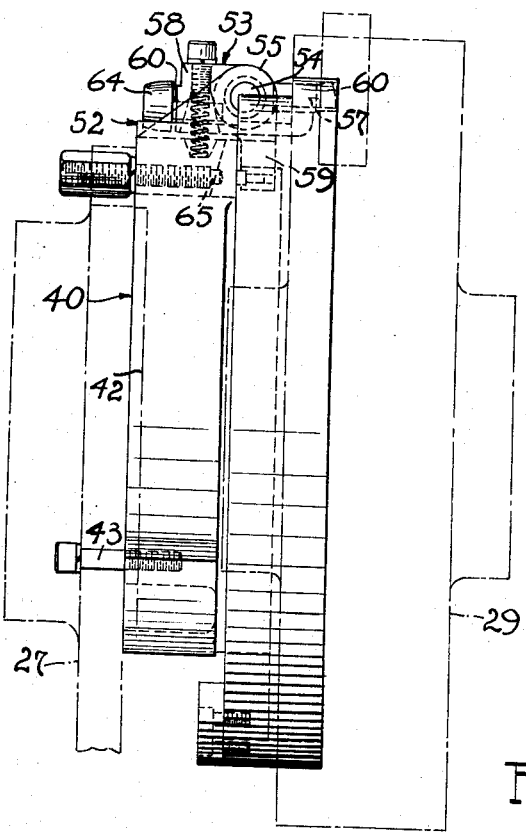

Stationary transfer actuating device 40 includes a ring-shaped base 42 attached to side wall 27 of lower frame portion 5 by screw members 43 (see Fig. 25), a cam assembly 44 formed by cam segments 45, 46, 47 which are secured to base 42 by screw members 48, and a transfer pin lifter mechanism 49 seated in a recess 50 of base 42 and attached thereto by screw members 51. Cam assembly 44 has open loop form and is extended with one side of its cam segments 45, 46, 47 and transfer pin lifter mechanism 49 through circuitous groove 35 in forming wheel 29 into the recesses 39 in transfer pins 37 to be coupled therewith and control their axial shifting in bores 31 when forming wheel 29 is rotated. Cam segment 45 shifts transfer pins 37 into engagement with transfer pin lifter mechanism 49 and cam transfer segment 47 receives the transfer pins from transfer pin lifter mechanism 49.

Figure 22:
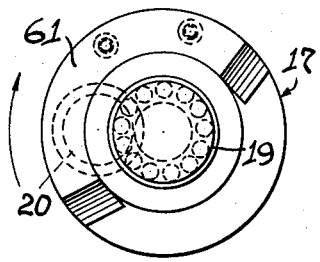

The transfer pin lifter mechanism embodies a U-shaped bracket 52 and a pin lifter lever 53 pivoted on shaft 54 secured in the flanges 55 of bracket 52. Pin lifter lever 53 embodies a body 56 formed with two substantially aligned, oppositely extended lever arm portions 57, 58 and a third lever arm portion 59 arranged in angular relation to lever arm portions 57 and 58. Lever arm portion 57 supports a lifter finger 60 and lever arm portion 58 supports two compression springs 62 shifting said latter lever arm portion with its roller 64 into engagement with cam means 61 (see Figs. 1, 20 and 22) on crank shaft 17. Lever arm portion 59 cooperates with an adjustable stop 65 (see Figs. 1 and 25) in U-shaped bracket 52, to arrest pin lifter lever 53 for proper alignment of recesses 39 of transfer pins 37 with cam segment 47 when transfer pins 37 are transferred to cam segment 47. The described arrangement permits adjustable timing of axial movements of transfer pins 37 with respect to wire forming mechanism 4 by a rotatory adjustment of crank shaft 17, as will be later described.

Figure 3:
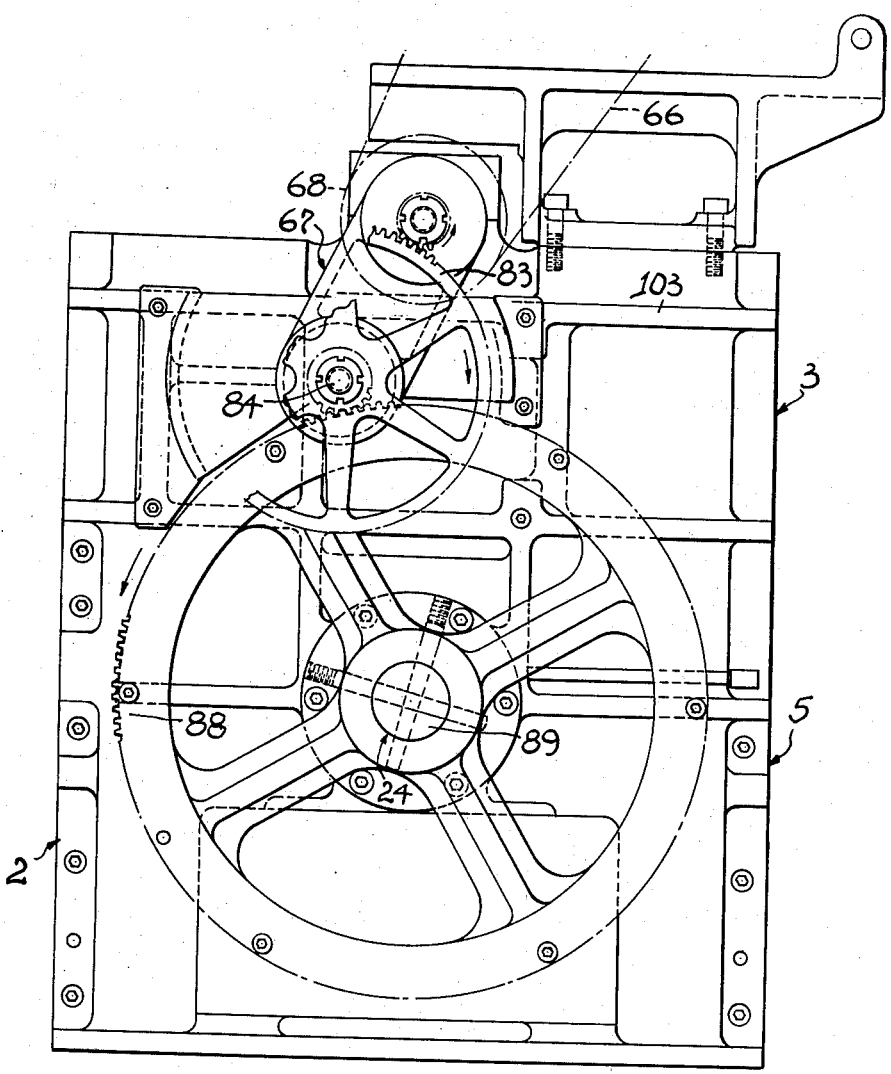
Fig. 3 is a fragmentary rear view of the wire bending machine.
Figure 4:
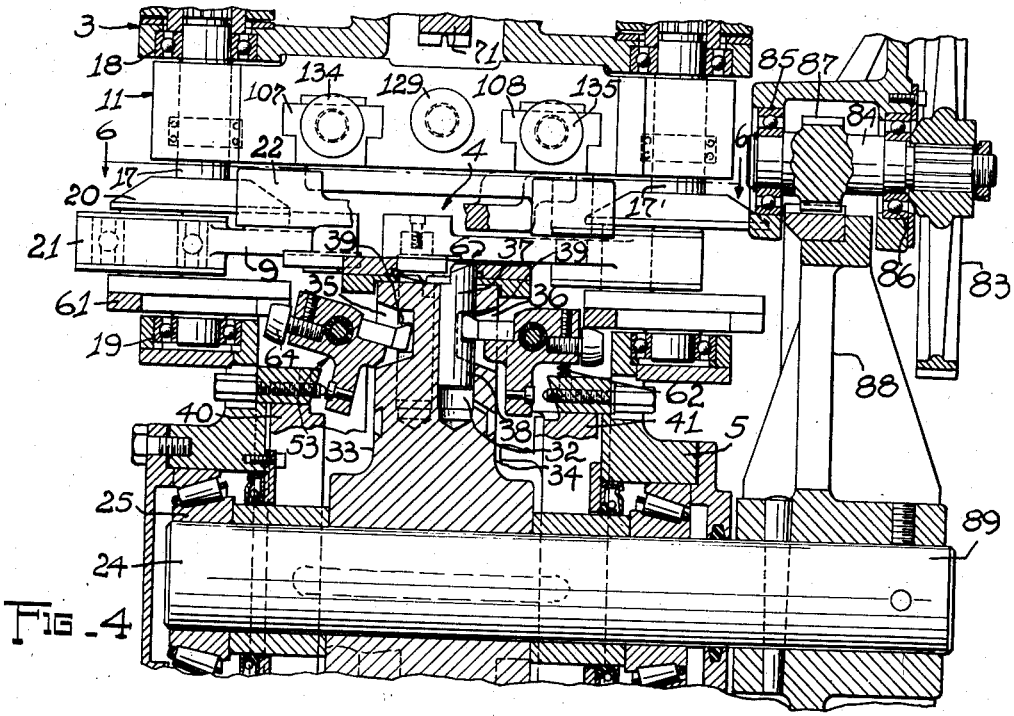
Fig. 4 is an enlarged fragmentary transverse sectional view similar to Fig. 1, showing the forming-wheel and transfer-pin actuating mechanism in an advanced position.

Wire forming mechanism 4 and wire transfer mechanism 6 are jointly driven by a motor-driven drive shaft assembly 67 (see Fig. 1) including a drive shaft 68 mounted in upper frame portion 3 on ball bearings 69, 70. This shaft supports a sprocket wheel 71 engaged with sprocket chain 66 (see Fig. 3) and two bevel drive pinions 72, 73 meshing with rotatably adjustable bevel gears 74, 75 on crank shafts 17, 17′ to rotate these shafts in opposite directions. Drive shaft assembly 67 also effects rotation of transfer pin supporting forming wheel 29 by coupling bevel drive pinion 73 by bevel gear 75 and gearing 78 with shaft 24 of the forming wheel. Gearing 78 includes a short shaft 79 journaled in bearing 80 and mounting at one end a bevel pinion 81 meshing with bevel gear 75 and at its other end a pinion 82 meshing with spur wheel 83 at one end of short shaft 84 journaled in bearings 85, 86. Short shaft 84 supports a pinion 87 meshing with a bull gear 88 mounted on extended shaft portion 89 of shaft 24.

Proper timing of wire forming mechanism 4 with respect to wire transfer mechanism 6 is effected by rotatory adjustments of bevel gears 74, 75 on crank shafts 17, 17′ identically supporting their bevel gears, so that description of mounting of only one of the bevel gears, to wit: bevel gear 74 on crank shaft 17, is deemed to be sufficient.

To permit such a rotatory adjustment of bevel gear 74, crank shaft 17 mounts on splined portion 90 (see Fig. 20) a sleeve 91 having an upper portion 92 and a reduced lower portion 93. Gear 74 is rotatably sleeved upon lower portion 93 and rotatable adjustable secured to upper portion 92 by headed set screws 94 extended through curved slots 95 in upper portion 92. In addition, upper sleeve portion 92 is cut out at 96 and has extended into the cut-out an adjusting block 97 attached to bevel gear 74 by screw 98. Adjusting block 97, being substantially smaller than cutout 96, permits adjustment of bevel gear 74 with respect to sleeve 91 by adjusting screws 99 in sleeve portion 92, which screws engage opposite sides of adjusting block 97.

Figure 5:
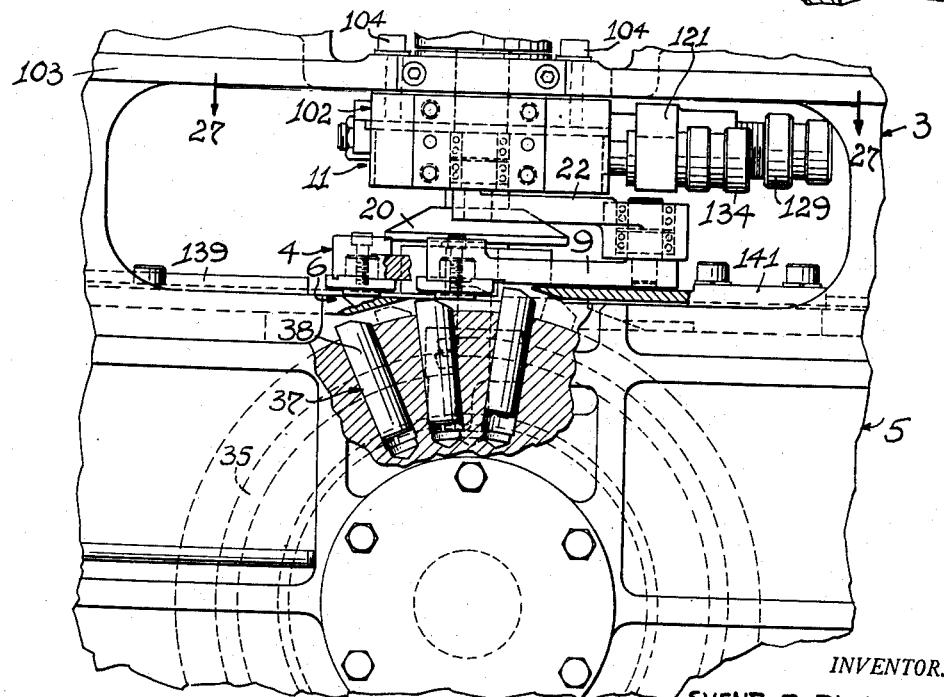
Fig. 5 is an enlarged fragmentary front elevation with parts partly broken away to show the trip and guide arrangement for the transfer pins.
Figure 28:
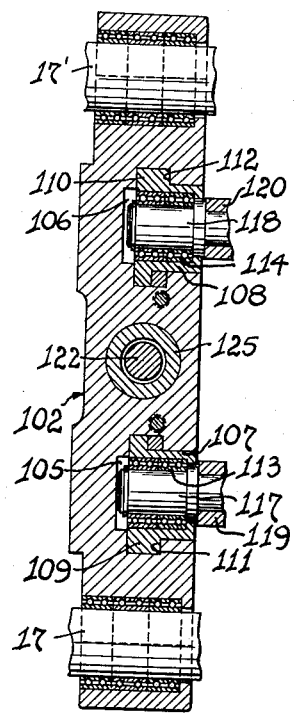
Figure 29:
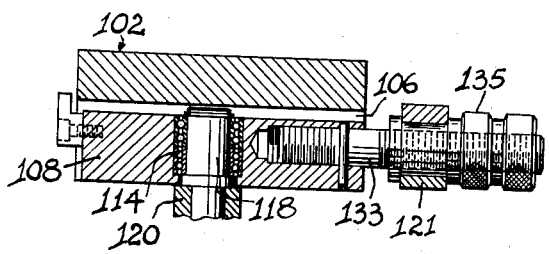
Figure 30:
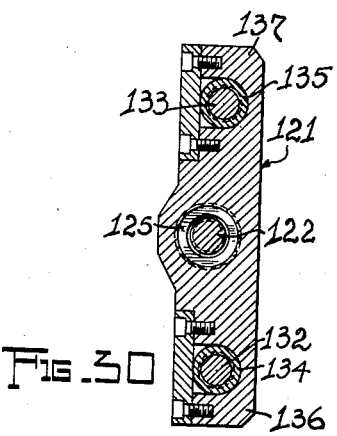

Shape and form of wire strips bent by the described device is controlled by the travel of the wire bending pins 16, 16' travelling through elongated circuitous paths 23, 23' (see Fig. 6) arranged in angular relation to the longitudinal axis of the device. A change in shape and form of these paths, changing shape and form of the bent wire strip, is readily effected by a change in link assembly 11 hinging elements 9, 9' to frame portion 3. This link assembly embodies a base structure 102 (see Fig. 29) suspended from cross plate 103 of upper frame portion 3 by screw members 104 (see Fig. 5). Base structure 102 is arranged in symetrical relation to the longitudinal axis of wire forming mechanism 4 crosswise thereof and slidably supports in shouldered bottom recesses 105, 106 (see Fig. 28) parallel link suporting slides 107, 108 for links 22, 22', which slides rest with their flanges 109 and 110 on shoulders 111, 112 of recesses 105, 106. Link suporting slides 107, 108 mount ball bearings 113, 114 (see Fig. 28), pivotally coupled with pivot pins 117, 118 in end portions 119, 120 of links 22, 22' and are coupled with each other by a coupling yoke 121 permitting joint and individual shifting of the link supporting slides in base structure 102. Coupling yoke 121 is axially adjustably sleeved upon an elongated screw member 122 extended into a recessed bore 123 of base structure 102 and secured thereto by a nut 124. This screw member is extended through axially aligned tubular extensions 125, 126 extended from opposite faces of coupling yoke 121. Tubular extension 125 guides the yoke in the recessed portion 127 of its bore 123 and tubular extension 126 cooperates with the threaded end 131 of screw member 122 in effecting axial shifting of yoke 121 by an externally and internally threaded tubular adjusting member 129 threadedly engaged with the threads 130 of tubular extension 126 and threaded end 131 of screw member 122. Coupling yoke 121 is adjustably coupled with each of the link supporting slides 107, 108 which, for such purpose, mount in their end portions opposite yoke 121 studs 132, 133 carrying adjusting nut members 134, 135 freely rotatably supported in arms 136, 137 of yoke 121 in symmetrical relation with respect to the axis thereof. Adjusting member 129 effects joint axial adjustment of slides 107, 108 and adjusting nut members 134, 135 individual axial adjustment of each of said slides.

Figure 31:
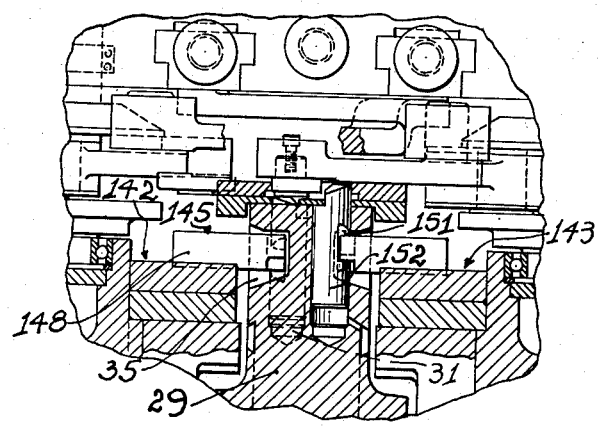
Fig. 31 is a fragmentary transverse sectional view similar to Fig. 4, showing the forming wheel and a modified form of transfer pin actuating mechanism.
Figure 34:
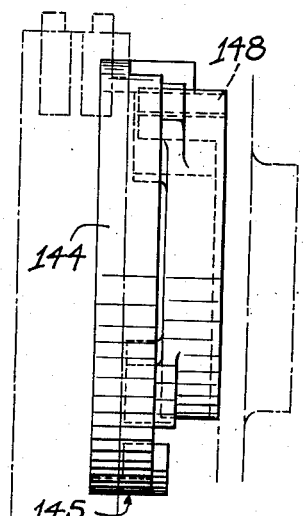
Figs. 32 through 34 show one of the modified transfer pin mechanisms. Thus.
Figure 32:
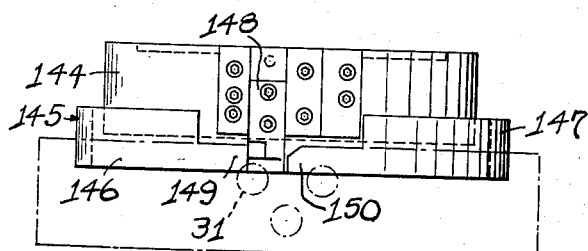
Figure 33:
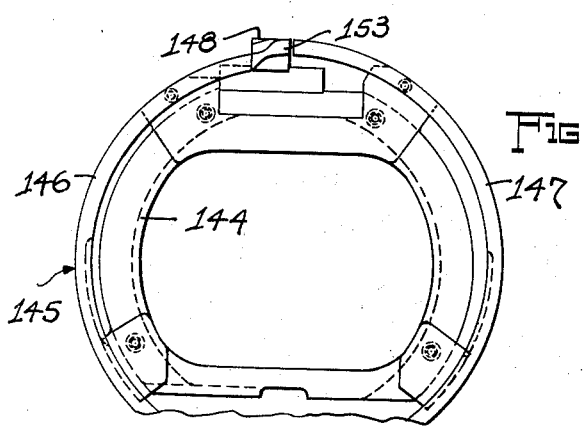
Figure 37:
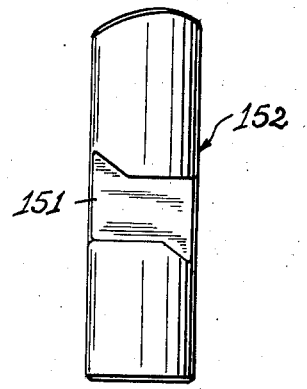
Fig. 37 is a side view of one of the transfer pins shifted by the modified form of transfer pin actuating mechanism.
Figures 35, 36:
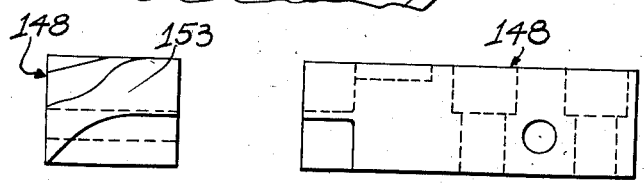
Fig. 35 is an end view of a transfer pin actuating cam member of the modified transfer pin actuating mechanism.
Fig. 36 is a side view of Fig. 35.

Axial shifting of the transfer pins in forming wheel 29 may be effected in a somewhat simpler manner by the modified form of transfer pin actuating devices 142, 143 shown in Fig. 31. Transfer pin actuating devices 142, 143 are symmetrically arranged with respect to the longitudinal axis of wire transfer mechanism 6 and of identical construction, therefore, description of only one of these transfer pin actuating devices, to wit: actuating device 142, is deemed to be necessary.

Transfer pin actuating device 142 is stationary and includes a ring-shaped base 144, a cam assembly 145 with cam segments 146, 147 secured to base 144, and a transfer pin lifter cam member 148 mounted on base 144 and extended between the opposed end portions 149, 150 of cam segments 146, 147. Cam assembly 145 and transfer pin lifter cam member 148 extend with their one sides through circuitous groove 35 in forming wheel 29 into cam-shaped recess 151 of transfer pins 152 to be coupled therewith and control their axial shifting in the bores 31 when forming wheel 29 is rotated. Cam segment 146 shifts transfer pins 152 into engagement with transfer pin lifter cam member 148 and cam segment 147 receives the transfer pins 152 from transfer pin lifter cam member 148.

Transfer pin lifter cam member 148 engages with its camming portion 153 the cam-shaped recesses 151 in transfer pins 152 and effects by cooperation therewith the required quick-lift of transfer pins 152 necessary for proper cooperation of wire forming mechanism 4 and wire transfer mechanism 6.

Figure 21:
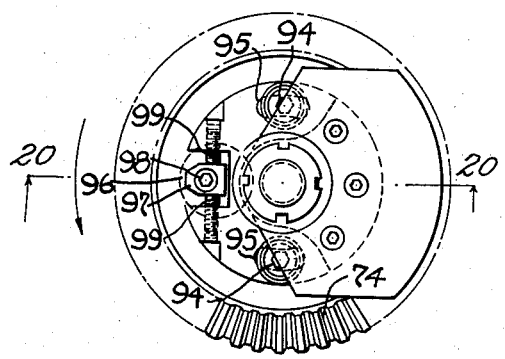
Figure 27:
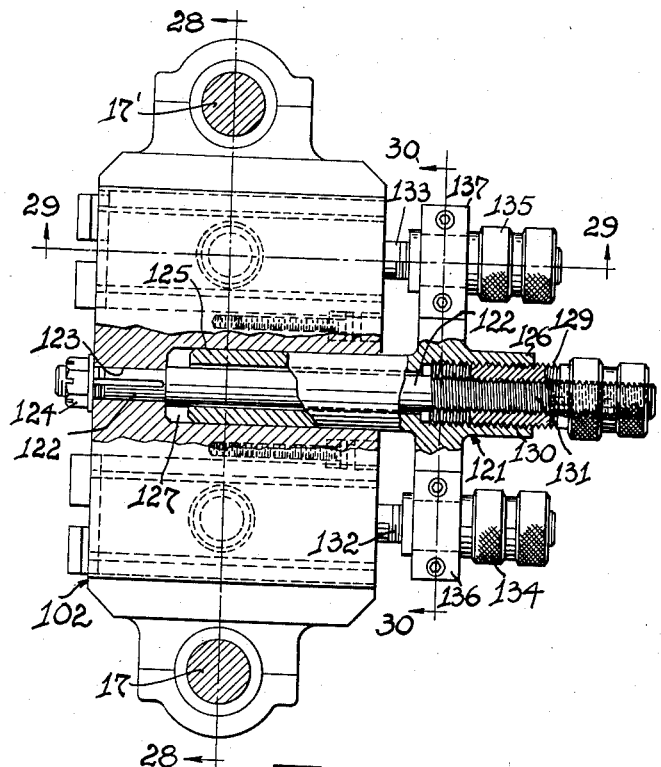
Figs. 27 through 30 show the adjustable support coupling the link members for the bending pin supporting members with the upper frame of the wire bending machine. Thus.

Wire bending machines of the type described shape in continuous, uninterrupted operation straight wire into sinuously corrugated wire strip having the desired shape and spacing of loops. These wire bending machines receive in operation previously straightened wire 138 through entrance wire guard 139 (see Fig. 6) at the left side (Fig. 2) of upper frame portion 3, shape such wire by bending operations in wire forming mechanism 4 and wire transfer mechanism 6, and discharge the formed wire strip 140 through exit wire guard 141 at the right side (Fig. 2) of frame portion 3. Bending operations are effected by wire bending pins 16, 16' and transfer pins 37, 37' as shown in diagrammatic views Figs. 11 through 19, disclosing in sequence advancing positions of bending pins 16, 16' and transfer pins 37, 37'. In these bending operations, in which the bending pin supporting members 9, 9' are driven by oppositely rotating crank shafts 17, 17', bending pins 16, 16' travel in elongated circuitous paths 23, 23' (see Fig. 6) subject to changes, as previously described, by operation of adjusting screws 99 (see Fig. 21) and either one of the adjusting nut members 129, 134 and 135 (see Figs. 2 and 27).

Having thus described my invention, what I claim is:

1. In a wire forming machine a frame, forming pin supporting means, and supporting and shifting means for the forming pin supporting means, said supporting and shifting means including crank shaft means mounted on the frame and having a crank arm connected to the forming pin supporting means at one area thereof, link supporting means adjustably shiftably mounted on the frame, and a link pivotally connecting the link supporting means with the forming pin supporting means at an area different from the first area thereof, said areas arranged at separate locations to effect shifting of the forming pin supporting means through an adjustable circuitous level path.

2. In a wire forming machine a frame, a pair of forming pin supporting means, and supporting and shifting means shiftably supporting the forming pin supporting means and coupling same with the frame, said supporting and shifting means including a pair of oppositely rotatable crank shafts on the frame coupled with the forming pin supporting means, a pair of link supporting members on the frame and a link means on each of the supporting members, each of said link means being coupled with one forming pin supporting means at locations spaced from the coupling location of a crank shaft with a forming pin supporting means.

3. A wire forming machine as described in claim 2, wherein each link supporting member embodies a slide, and wherein the link means have two links coupling the two slides with the forming pin supporting means, and adjusting means for the two slides adapted to adjust said slides jointly and individually.

4. A wire forming machine as described in claim 2, including in a pair of slides for link supporting members, said slides connected by the link means to the pair of forming pin supporting means, individual shifting means for each of said slides, means connecting the slides to each other, and shifting means for the connecting means to permit joint shifting of the slides.

5. A wire forming machine as described in claim 2, wherein the pairs of link supporting members includes a base attached to the frame, parallel slides shiftably mounted in the base, yoke means coupling the slides to each other, and means shiftably connecting the yoke means to the base.

6. A wire forming machine as described in claim 5, including threaded studs on said slides extended through bores in the yoke means and nut members for said studs swiveled to said yoke means to permit individual shifting of said slides by the nut members.

7. In a wire forming machine a frame, a pair of forming pin supporting means, and supporting and shifting means for the forming pin supporting means, said supporting and shifting means being mounted on the frame and including crank shaft means and link means, said crank shaft means and link means being coupled with the forming pin supporting means at said crank shaft means being rotatably adjustably mounted on said frame and said link means being laterally adjustably linked to the frame to adjustably support the forming pin supporting means and control their movements.

8. In a wire forming machine a frame, a pair of crank shafts mounted on said frame, a pair of forming pin supporting members pivoted to said crank shafts, a forming pin for each of said forming pin supporting members extended downwardly therefrom, a pair of link members arranged above the supporting members linking same to the frame, rotary transfer pin supporting means below the forming pin supporting means and shiftable transfer pins in said transfer pin supporting means, said forming pin supporting means and said transfer pin supporting means coupled with each other to effect in wire bending operations timed cooperation of the forming pins and transfer pins.

9. In a wire forming machine of the class described including a frame and wire guide means disposed along the center thereof arranged to guide wire through the machine, a pair of contra-rotating angularly related cranks, one crank mounted at each side of the machine center, a forming pin supporting means journaled on each crank, each of said forming pin supporting means carrying a wire forming pin spaced from the crank of said forming pin supporting means, and a pair of link means each pivotally connected at one end to the machine frame and at the other end to a forming pin supporting means at a point laterally spaced from the journal of crank and from its forming pin, said crank and link means arranged to cause said forming pins to travel in opposite elongated circuitous level paths and bend wire passing through the machine to flat sinuous-like configuration.

10. A wire forming machine as claimed in claim 9 including means for adjusting the location of the pivotal link connections to said frame whereby to vary the shape of the flat sinuous-like configuration of the wire produced by said machine.

11. A wire forming machine as claimed in claim 9 including means for varying the angular relationship of the contra-rotating cranks with respect to each other to vary the shape of the flat sinuous-like configuration of the wire produced by said machine.

References Cited in the file of this patent

UNITED STATES PATENTS

| | | |
|---|---|---|
| Re. 23,169 | Horton | Nov. 22, 1949 |
| 1,042,756 | Beeman | Oct. 29, 1912 |
| 1,254,455 | Wadsworth | Jan. 22, 1918 |
| 2,188,406 | Horton | Jan. 30, 1940 |
| 2,305,266 | Lincoln | Dec. 15, 1942 |